Figure 1:
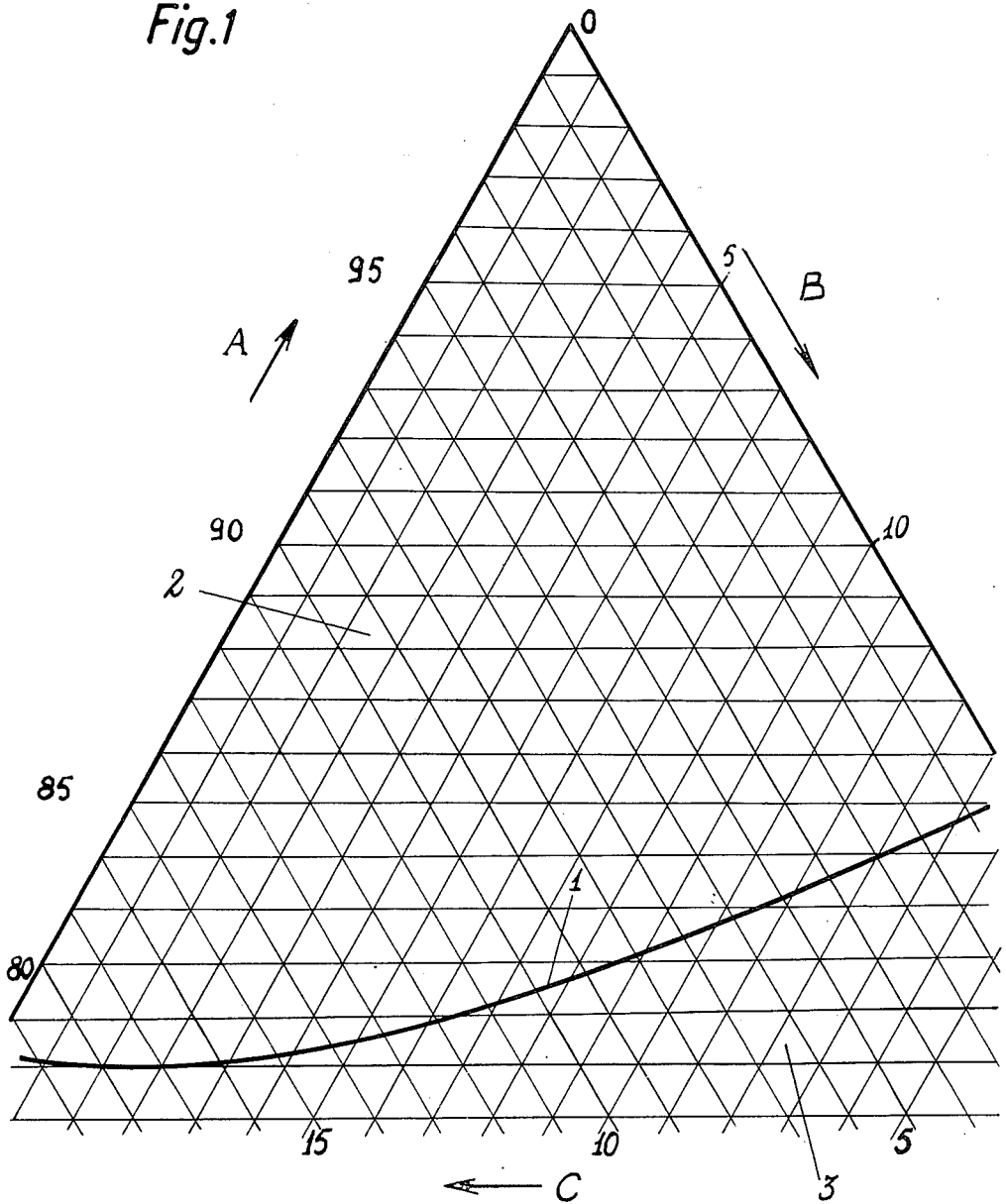

United States Patent [19]
Roche et al.

[11] 3,878,121

[45] Apr. 15, 1975

[54] METHOD OF ENCAPSULATION BY COACERVATION, AND THE SUBSTANCES OBTAINED

[75] Inventors: Gerard Roche, Viry Chatillon; Bernard Dumas, Vert le Grand, both of France

[73] Assignee: Societe nationale des Poudres et Explosifs, Paris, France

[22] Filed: Dec. 7, 1972

[21] Appl. No.: 312,932

[30] Foreign Application Priority Data
Dec. 28, 1971 France .............................. 71.47022

[52] U.S. Cl. .......... 252/316; 117/62.2; 117/1100 B; 149/8; 252/188
[51] Int. Cl. ...... B01j 13/02; B44d 1/02; B44d 1/44
[58] Field of Search ............... 252/316, 188; 149/8; 424/32; 117/100 B, 62.2

[56] References Cited
UNITED STATES PATENTS

| | | | |
|---|---|---|---|
| 2,513,997 | 7/1950 | Gibb, Jr. .............................. | 252/188 |
| 3,173,878 | 3/1965 | Reyes .................................. | 252/316 |
| 3,242,051 | 3/1966 | Hiestand et al. ................. | 252/316 X |
| 3,415,758 | 12/1968 | Powell et al. ...................... | 252/316 |
| 3,441,455 | 4/1969 | Woods et al. ........................... | 149/8 |
| 3,577,515 | 5/1971 | Vandegaer ...................... | 252/316 X |

FOREIGN PATENTS OR APPLICATIONS

| | | | |
|---|---|---|---|
| 907,284 | 10/1962 | United Kingdom ................ | 252/316 |
| 1,025,694 | 4/1966 | United Kingdom ............ | 117/100 A |

*Primary Examiner*—Richard D. Lovering
*Attorney, Agent, or Firm*—Bucknam and Archer

[57] ABSTRACT

The present invention relates to a method of encapsulation by coacervation of fine particles of a very reactive substance such as an alkali metal or a very powerful reducing agent. The said substance is suspended in a polyurethane resin solution made up of constituents which do not react with the substance, the coacervate is obtained by adding more of one of the constituents of the solution, the resulting mixture is dispersed in a slightly polar liquid which does not mix with the mixture and contains in solution an agent for cross-linking polyurethane resin, and the encapsulated substance is then separated from the liquid and dried.

11 Claims, 3 Drawing Figures

METHOD OF ENCAPSULATION BY COACERVATION, AND THE SUBSTANCES OBTAINED

The invention relates to a method of encapsulation by coacervation of fine particles of a very reactive substance such as an alkali metal or a very powerful reducing agent such as lithium hydride. The invention also relates to substances obtained by the method.

As it is known, alkali metals such as lithium and their simple or complex hydrides, such as lithium hydride or the double hydride of lithium and aluminium, are difficult to handle owing to their high reactivity with the water in the ambient atmosphere. The substances are also difficult to encapsulate owing to their reactivity with a number of solvents, resins and polymers.

In prior-art encapsulation methods, a resin or a mixture of resins is deposited by separating a solvent from a nonsolvent. The prior-art methods use aqueous or organic solvents and non-solvents which react with alkali metals and simple or complex hydrides thereof. The solvents or non-solvents may be e.g. alcohols, ketones or acids. Other solvents, such as dioxan, tetrahydrofuran and ethers, do not react when pure with alkali metals and hydrides, but are reactive in practice owing to their non-negligible peroxide or moisture content. They therefore have to be very highly purified before use.

A number of the prior-art solvents, furthermore, are inflammable, which increases the danger of using them.

The invention aims to obviate the aforementioned disadvantages and provide a novel method of encapsulation which is easy to perform, is not complicated, and is not dangerous during operation.

According to the invention, the method of encapsulation by coacervation of fine particles of a very reactive substance such as an alkali metal or a very powerful reducing agent, is characterised in that the substance is suspended in a polyurethane resin solution made up of constituents which do not react with the substance, the coacervate is obtained by adding more of one of the constituents of the solution, the resulting mixture is dispersed in a slightly polar liquid which does not mix with the mixture and contains in solution an agent for cross-linking polyurethane resin, and the encapsulated substance is then separated from the liquid and dried.

In a preferred embodiment of the method according to the invention, the polyurethane resin solution used contains methylene chloride and chloroform and the coacervate is obtained by adding more methylene chloride.

Methylene chloride and chloroform are non-flammable, do not react with alkali metals or hydrides thereof, and are commercially available in dry form. In another preferred embodiment of the invention, the polyurethane resin used contains phenoxy groups and its degree of polymerisation is preferably 100.

The resins are made up of the following monomeric unit:

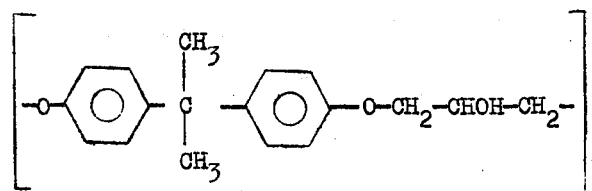

More particularly, the resin may be that sold under the name PKHH by Union Carbide and the resin sold under the name Rutapox 0717 by Bayer.

Preferably the slightly-polar liquid is fluorochlorinated hydrocarbon, and the cross-linking agent is a diisocyanate.

Fluorochlorinated hydrocarbons do not react with the substances to be encapsulated and, since they are very slightly polar, they prevent the finely-divided, dispersed particles from agglutinating into lumps.

Furthermore the fluorochlorinated hydrocarbons, which are commercially known as Freons and are sold by Du Pont de Nemours, do not react with polyurethane resins.

In an advantageous enbodiment of the invention, the substance to be encapsulated is suspended in the following products within the following limiting concentrations by weight:

| | | |
|---|---|---|
| Phenoxy polyurethane resin | : | 3 to 25% |
| Methylene chloride | : | 40 to 65% |
| Chloroform | : | 25 to 50% |

The coacervate is subsequently obtained, by adding between 2 and 5 volumes of methylene chloride to the solution of polyurethane resin.

Figure 2:
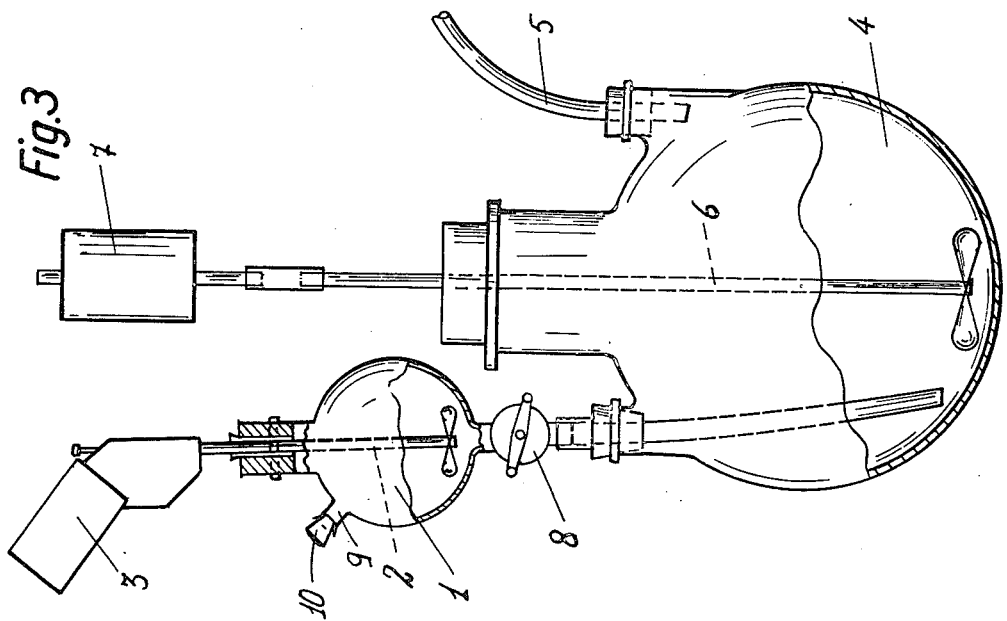
Figure 3:
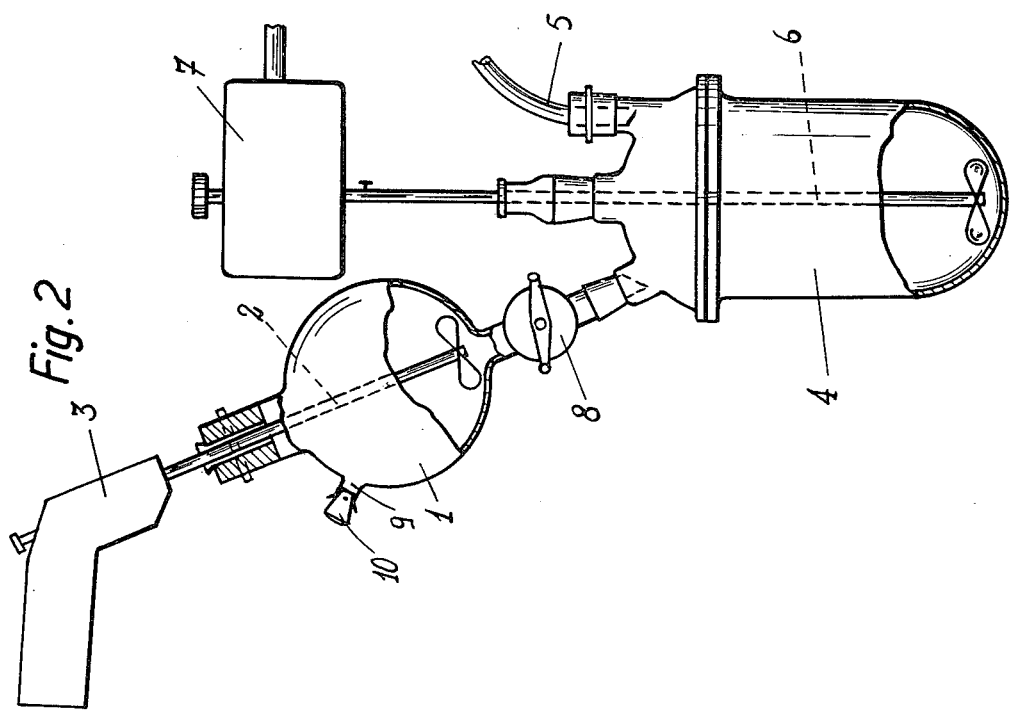

Other features of the invention will be clear from the following description and the accompanying illustrative drawings, in which:

FIG. 1 is a ternary diagram at 250°C of the system made up of phenoxy polyurethane resin B, methylene chloride A and chloroform C, FIG. 2 is a diagram of an embodiment of apparatus for working the method according to the invention, and FIG. 3 is a diagram of a second embodiment of apparatus for working the method.

With reference to the ternary diagram is FIG. 1, a separation line 1 divides the diagram into two regions, a region 2 in which the coacervate exists at 25°C and a region 3 at which the coacervate does not occur. As can be seen, the coacervate, i.e. two liquid phases one of which is very rich in resin and the other of which is very poor in resin, can be obtained by adding additional methylene chloride A to a starting mixture comprising polyurethane resin B, methylene chloride A and chloroform C in proportions such that the representative point of the ternary mixture is in region 3 where the coacervate does not occur.

The following are non-limitative examples of the method according to the invention.

EXAMPLE 1

The following substances were introduced via orifice 8 into a ballon flask 1 forming part of the apparatus shown in FIG. 2:

40 g lithium hydride having a particle size between 100 and 250 microns, 25 cm³ of a methylene chloride solution containing 5% by weight of phenoxy polyurethane resin (PKHH) and 10 cm³ chloroform.

The mixture was agitated with agitator 2 actuated by motor 3, and 100 cm³ methylene chloride was added, with further agitation to form the coacervate.

The following substances were introduced into flask 4:

400 cm³ trifluorotrichloroethane and
12 cm³ toluene diisocyanate.

A partial vacuum of 200 Torr, corresponding to the vapour pressure of trifluorotrichloroethane at 250°C, was maintained in flask 4, by connecting a pipe 5 to a vacuum pump (not shown).

The solution introduced into the flask was vigorously agitated by agitator 6, actuated by motor 7.

After agitating the mixture in flask 1 and the solution in flask 4 for a few minutes, cock 8 of flask 1 was opened. The mixture in flask 1 was then sucked into flask 4, during which the lithium hydride particles were vigorously dispersed.

Trifluorotrichloroethane, which is slightly polar, prevents the coacervate-coated particles from sticking together again, and toluene diisocyanate rapidly cross-links polyurethane resin.

Stirring was continued for a few more minutes.

If required, flask 4 can be flushed with inert gas such as argon via pipe 5. The argon escapes into the atmosphere via cock 8, which remains open, and via the orifice 9 of flask 1, from which stopper 10 has been removed.

After a few minutes of agitation and flushing with argon, flask 4 can be opened. The resin-encapsulated particles are then separated from the liquid phase, by filtration and rinsing with trifluorotrichloroethane. The particles are then dried in vacuo.

The resulting particles can slightly be stuck to one another to form lumps. They can easily be detached by gently shaking the vessel containing them. Alternatively, the lumps can be very gently pressed against a screen, in a glove-box protected from atmospheric moisture.

In order to determine the total quantity of resin coating the particles, the following coating rate is defined:

$T/100 = (P-P_o)/P_o$ where P is the weight of coated particles and $P_o$ is the weight of particles before coating.

In the case of lithium hydride particles coated by the method given in example 1, we obtain:

$T = 4.5\%$

In order to judge the efficiency of the resulting encapsulation, the resin-coated substances are placed in contact with an organic acid having low vapour pressure, e.g. caprylic acid.

The acid reagent acts on particles which have not been coated or not sufficiently so, and liberates hydrogen which is detected by a thermal-conductivity detector used in conjunction with a gas-phase chromatograph without a column.

If $h_o$ represents the height of the chromotographic peak for hydrogen liberated per weight $x_o$ of non-encapsulated substance, and if $h$ denotes the height of the peak for hydrogen liberated per weight $x$ of encapsulated substance, the relation:

$R/100 = h.x_o/h_o.x$ defines the reactivity rate of the encapsulated produce compared with caprylic acid.

Clearly, the particles are protected in proportion as R approaches zero.

In the case of lithium hydride particles coated by the method given in Example 1, we obtain:

$R = 3\%$

The purity of the resulting product can be found by determining the total proportions in which hydrogen is liberated by the encapsulated and non-encapsulated substances when acted upon by water.

In this manner, we determine the proportion of active hydrogen:

$H/100 = h_1.x_o/h_o.x$ where $h_1$ is the proportion of hydrogen measured in the encapsulated product and $h_o$ is the proportion of hydrogen measured in the non-encapsulated substance and $x_o$ and $x$ represent the weight of non-encapsulated and encapsulated substances respectively.

In the case of lithium hydride particles encapsulated by the method given in Example 1, we obtain:

$H = 94\%$

The difference from 100% allows for thw weight of resin, which is equal to 4.5% of the weight of encapsulated substances.

EXAMPLE 2

The following substances were introduced into flask 1 in the apparatus in FIG. 2:
- 30 g lithium having a particle size between 100 and 150 microns,
- 15 cm³ of methylene chloride solution containing 5% by weight of phenoxy polyurethane resin (PKHH) and
- 5 cm³ chloroform.

The mixture was agitated and 100 cm³ methylene chloride was added.

The following substances were introduced into flask 4:
- 400 cm³ trifluorotrichloroethane and
- 8 cm³ toluene diisocyanate.

The rest of the process was the same as in Example 1.

The results after proportioning were:

The coating rate T was 4.5%

The reactivity rate R with caprylic acid was 5%. In order to determine the purity of the resulting substance the following lithium purity factor is defined $L/100 = P/P_o$ The proportion of lithium L was found to be 90% in the example given. The difference between L and 100% allows for the coating rate of 4.5%.

EXAMPLE 3

The following substances were introduced into flask 1 in the apparatus shown in FIG. 3:
- 47 g lithium hydride having a particle size between 100 and 250 microns,
- 29 cm³ of methylene chloride solution containing 5% by weight of phenoxy polyurethane resin (PKHH) and 0.2 g trimethylol propane, and
- 10 cm³ chloroform.

The mixture was agitated and 100 cm³ methylene chloride was added.

The following substances were introduced into flask 4:
- 400 cm³ trifluorotrichloroethane and
- 12 cm³ toluene diisocyanate.

The rest of the process was the same as in Example 1.

After proportioning, the following results were obtained:

Coating rate T = 5.3%
Reactivity rate R with caprylic acid = 5%
Proportion of active hydrogen H = 89%.

When immersed in water, the encapsulated substances were not acted upon for 4 or 5 minutes.

EXAMPLE 4

The following substances were introduced into flask 1 in the apparatus shown in FIG. 3:

47 g lithium hydride,
29 cm³ methylene chloride solution containing 5% by weight of phenoxy polyurethane resin (PKHH) and
10 cm³ chloroform.

The mixture was agitated and 100 cm³ methylene chloride was added.

The following substances were introduced into flask 4:

400 cm³ trifluorotrichloroethane and
12 cm³ hexamethylene diisocyanate.

THe rest of the process was the same as in Example 1.

The following results were obtained after proportioning:

Coating rate T = 3.6%
Reactivity rate R with caprylic acid = 3.6%, and
Proportion of active hydrogen H = 90%.

EXAMPLE 5

The following substances were introduced into flask 1 of the apparatus shown in FIG. 2:

34 g lithium hydride,
25 cm³ methylene chloride solution containing 5% by weight of phenoxy polyurethane resin (Rutapox 0717), and
25 cm³ chloroform.

The mixture was agitated and 150 cm³ methylene chloride was added.

The following substances were introduced into flask 4:

100 cm³ trifluorotrichloroethane and
11 cm³ toluene diisocyanate.

The rest of the process was as in Example 1.

The following results were obtained after proportioning:

Coating rate T = 3.5%
Reactivity rate R with caprylic acid = 3%, and
Proportion of active hydrogen H = 90%.

EXAMPLE 6

The following substances were introduced in flask 1 of the apparatus shown in FIG. 3:

37 g aluminium lithium hydride (AlLiH$_4$)
31 cm³ methylene chloride solution containing 5% by weight of phenoxy polyurethane resin (PKHH) and
31 cm³ chloroform.

The mixture was agitated and 150 cm³ methylene chloride was added.

The following substances were introduced into flask 4:

200 cm³ trifluorotrichloroethane and
7 cm³ hexamethylene diisocyanate.

The rest of the process was as in Example 1.

The following results were obtained after proportioning:

Coating rate T = 4.5%
Reactivity rate R with caprylic acid = 0% and
Proportion of active hydrogen H = 86%.

The resulting coated particles of aluminium lithium hydride do not catch fire in contact with water, and are acted upon by water for a total period of the order of 1 minute.

These results show that particles of very strong reducing agents, such as lithium, lithium hydride or the double hydride of aluminium and lithium, are sufficiently protected by encapsulation performed by the method according to the invention. The reactivity rate with caprylic acid is between 0 and 5%, showing the effectiveness of the protection.

The protection is obtained with a proportion of resin less than 6% of the total weight of particles, and the thus-treated products are still between 86 and 94% pure, as shown by measuring the proportions of active hydrogen and lithium. The method is simple and not complicated, and requires only a few substances which are widely available commercially.

Clearly, the invention is not limited to the encapsulation of the substances described in the preceding examples, but relates to substances obtained by the method of encapsulation by coacervation according to the invention.

We claim:

1. A method of encapsulating a solid substance which is highly reactive with the water in the ambient atmosphere, by coacervation, which comprises preparing a solution of a polyurethane resin in a mixture of at least two solvents which do not react with said substance, dispersing in the said solution discrete particles of said solid substance, adding to said dispersionn a supplemetary volume of one of said solvents whereby the resin undergoes coacervation and deposits on the dispersed particles, dispersing the resulting mixture in a slightly polar liquid non miscible with the mixture and containing a diisocyanate compound whereby cross-linking of the polyurethane results, stirring the dispersed mixture, separating and drying the encapsulated particles of said solid substance.

2. A method according to claim 1 wherein the polyurethane resin solution used contains methylene chloride and chloroform and the coacervate is obtained by adding more methylene chloride.

3. A method according to claim 1 wherein the polyurethane resin used contains phenoxy groups and its degree of polymerisation is approximately 100.

4. A method according to claim 1 wherein the slightly polar liquid is a fluorochlorinated hydrocarbon.

5. A method according to claim 4, wherein the fluorochlorinated hydrocarbon used is trifluorotrichloroethane or difluorotetrachloroethane.

6. A method according to claim 4 wherein the diisocyanate compound is toluene diisocyanate or hexamethylene diisocyanate.

7. A method according to claim 1, wherein the polyurethane solution used contains the following substances within the following limiting concentrations by weight:

| | | |
|---|---|---|
| Phenoxy polyurethane resin | : | 3 to 25 % |
| Methylene chloride | : | 40 to 65 % |
| Chloroform | : | 25 to 50 %. |

8. A method according to claim 1, wherein the coacervate is obtained by adding from 2 to 5 volumes of methylene chloride to the polyurethane resin solution.

9. The method according to claim 1 wherein the solid substance is an alkali metal or a simple or a complex hydride thereof.

10. A method of encapsulating solid particles of an alkali metal or a simple or complex hydride thereof by coacervation, which comprises preparing a solution of phenoxy polyurethane resin in a mixture of methylene chloride and chloroform of the following composition by weight:

| | | |
|---|---|---|
| phenoxy polyurethane resin | : | 3 to 25% |
| methylene chloride | : | 40 to 65% |
| chloroform | : | 25 to 50% | dispersing in said solution discrete particles of said alkali metal or hydride, adding to said dispersion a supplementary volume of methylene chloride which is two to five times the volume of said solution, dispersing the resulting mixture in a polar liquid selected from the group consisting of trifluorotrichlorethane and difluorotetrachlorethane containing a diisocyanate selected from the group consisting of toluene diisocyanate and hexamethylene diisocyanate, stirring the dispersed mixture, separating and drying the encapsulated particles.

11. A substance encapsulated by the method according to claim 10.

* * * * *